United States Patent [19]
Bowers

[11] Patent Number: 5,736,651
[45] Date of Patent: Apr. 7, 1998

[54] HIGH TEMPERATURE GAS FLOW SENSING ELEMENT

[76] Inventor: James R. Bowers, 19615 Lake Rd., Rocky River, Ohio 44116

[21] Appl. No.: 653,749

[22] Filed: May 23, 1996

[51] Int. Cl.$^6$ ................................................. G01F 1/46
[52] U.S. Cl. ................................................. 73/861.66
[58] Field of Search ........................... 73/861.66, 861.65

[56] References Cited

U.S. PATENT DOCUMENTS

| | | | |
|---|---|---|---|
| 1,250,238 | 12/1917 | Spitzglass | 73/861.66 |
| 3,685,355 | 8/1972 | DeBaun | 73/861.66 |
| 4,297,900 | 11/1981 | Brandt, Jr. | 73/861.66 |
| 4,344,330 | 8/1982 | Renken et al. | 73/861.66 |
| 4,602,514 | 7/1986 | Kurrle et al. | 73/861.61 |
| 4,750,370 | 6/1988 | Ossyra | 73/861.61 |
| 5,481,925 | 1/1996 | Woodbury | 73/861.66 |
| 5,483,839 | 1/1996 | Meunier | 73/861.66 |

*Primary Examiner*—Richard Chilcot
*Assistant Examiner*—Jewel Artis
*Attorney, Agent, or Firm*—John D. Guguotta

[57] ABSTRACT

A high temperature gas flow sensing element is disclosed having a housing with similar internal dimensions as the fluid conduit, whether round or rectangular. An interior flow conditioner is affixed at the inlet of the flow element. A total pressure sensing pitot tube array is affixed traversing the interior cross sectional area of flow element for sensing the total pressure of fluid flowing into the flow element, and a static pressure sensing pitot tube array is also affixed traversing the interior cross sectional area of the flow element for sensing the average static pressure within the flow element. The pitot tubes and pressure sensing tubes are affixed at four places, two shell penetrations and two places at the manifolds, regardless of manifold design or the element shape. To prevent material stress and fatigue and leakage that can result from the different expansion rates of differing materials under high gradient temperature cycling, a high temperature packing, such as a ribbon packing or packing ring made of pliable material resistant to high temperatures, is used in place of the ferrule portion of a compression nut and fitting arrangement. Exterior first and second instrument taps are provide for connection of each array respectively to a differential pressure instrument for indicating flow rate and/or transmitting a flow rate signal. Further, exterior array access ports are provided to permit cleaning of each pitot arrays should they become plugged with particulates.

20 Claims, 10 Drawing Sheets

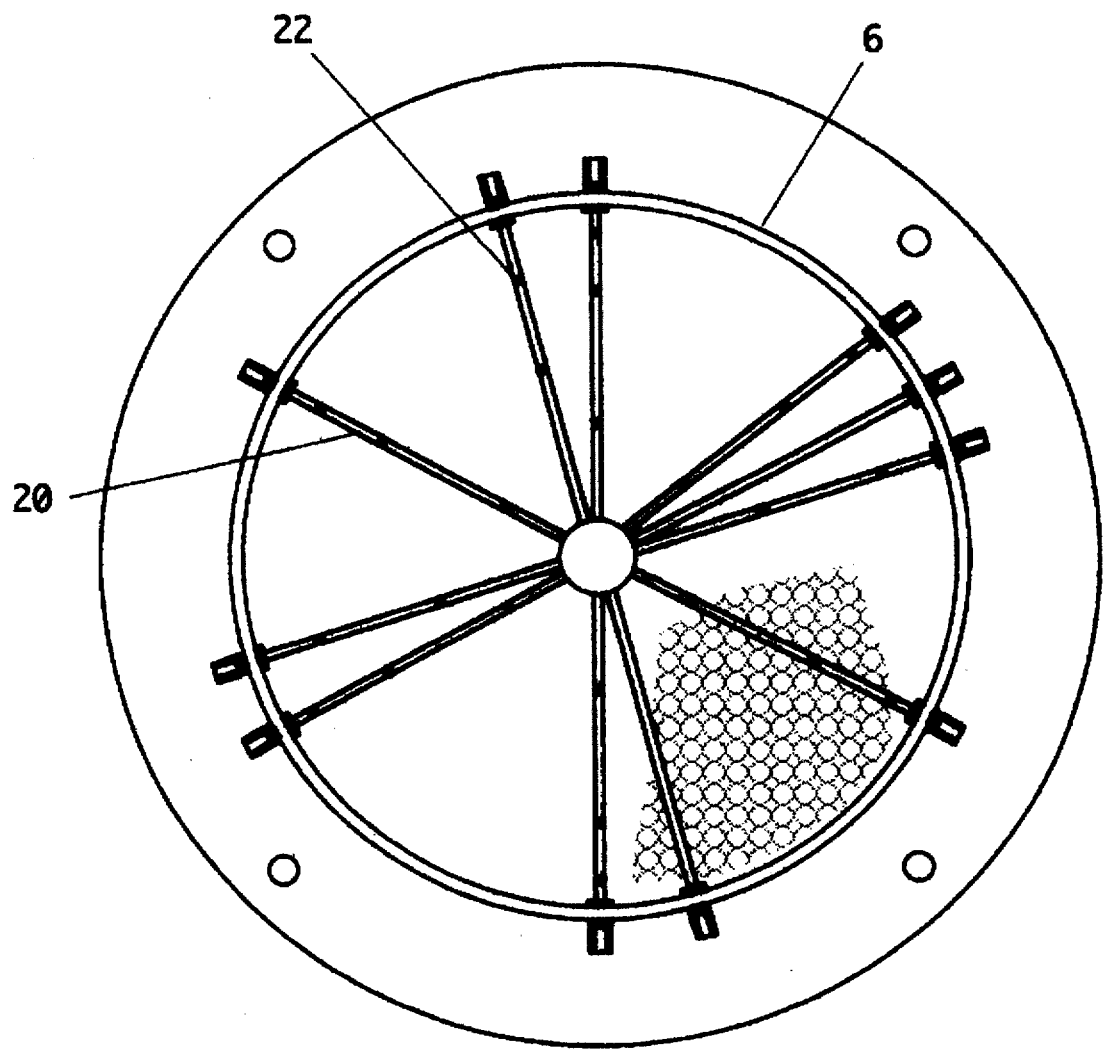
_Figure 3_

HIGH TEMPERATURE GAS FLOW SENSING ELEMENT

FIELD OF THE INVENTION

This invention relates to fluid flow sensing elements for measuring air or gas flowrates, and more specifically to an improved averaging pitot tube type flow element. It is particularly useful in measuring air and gas flows in large diameter ducts or pipes, and at high temperatures.

BACKGROUND OF THE INVENTION

The pitot tube has long been an standard flow measuring element used throughout the process industries. It has been found to be particularly useful for measuring flows in large diameter pipes or ducts. By positioning a pitot tube at various measuring points across a flowing stream profile, an average flowing velocity can be measured. This is referred to a pitot traverse. Because a flowing stream has a regular but non-linear fluid flow profile, the measuring points must be precisely located within the duct or pipe at positions established and recognized by engineering standards organizations in order to provide a reliable representation of the flowing velocities. Disturbances induced by piping configurations often result in a distorted velocity profile across the duct. Therefore, data from the traverse must be averaged to determine an average fluid flow velocity. This average is then multiplied by the duct or pipe cross sectional area to obtain a volumetric flow rate.

This manual traversing method requires precise positioning of the pitot tube. And, the process of collecting the velocity data and averaging the date is time consuming, particularly in large conduits. For this reason, individual pitot tubes are most often used for periodic testing, and seldom as permanently installed process flow measurement devices.

The present invention relates to a device specifically designed to utilize well-known and accepted pitot principles while eliminating the manual traverse and averaging processes. The present invention also relates specifically to a device that transforms the temporary testing nature of pitot tubes into a permanently installed process measuring device.

These and other difficulties experienced in the practical utilization of the prior art have been overcome by the present invention in a novel and nonobvious manner. It is a primary object of the present invention to provide for the accurate measuring of air or gas flows, especially in large diameter or rectangular conduits. It is also a major object of the present invention to provide for the accurate measuring of air or gas flows in high temperature applications, and especially in those applications which result in high temperature gradient thermal cycling of the type that would tend to cause material stress and fatigue related equipment failures.

BRIEF SUMMARY OF THE INVENTION

According to the preferred embodiment of the present invention, a fluid flow element with an inlet and an outlet is provided having a housing with the same internal dimensions as the fluid conduit, whether round or rectangular. An interior flow conditioner is affixed at the inlet of the flow element. A total pressure sensing pitot tube array is affixed traversing the interior cross sectional area of flow element for sensing the total pressure of fluid flowing into the flow element, and a static pressure sensing pitot tube array is also affixed traversing the interior cross sectional area of the flow element for sensing the average static pressure within the flow element. Pitot tube flow principles are thereby utilized by sensing the total pressure of the flowing gas or air with the total pressure sensing pitot tube array, and the static pressure within the conduit is sensed by the static pressure sensing pitot tube array. The total pressure which is developed by the flowing fluid is higher than the static pressure within the conduit, and the difference between these pressures results in a velocity pressure which is indicative of the fluid flow rate. Exterior first and second instrument taps are provide for connection of each array respectively to a differential pressure instrument for indicating flow rate and/or transmitting a flow rate signal. Further, exterior array access ports are provided to permit cleaning of the pitot arrays should they become plugged with particulates.

BRIEF DESCRIPTION OF THE DRAWINGS

FIG. 3 is front elevational view thereof;

DETAILED DESCRIPTION OF THE PREFERRED EMBODIMENT

Figure 1:
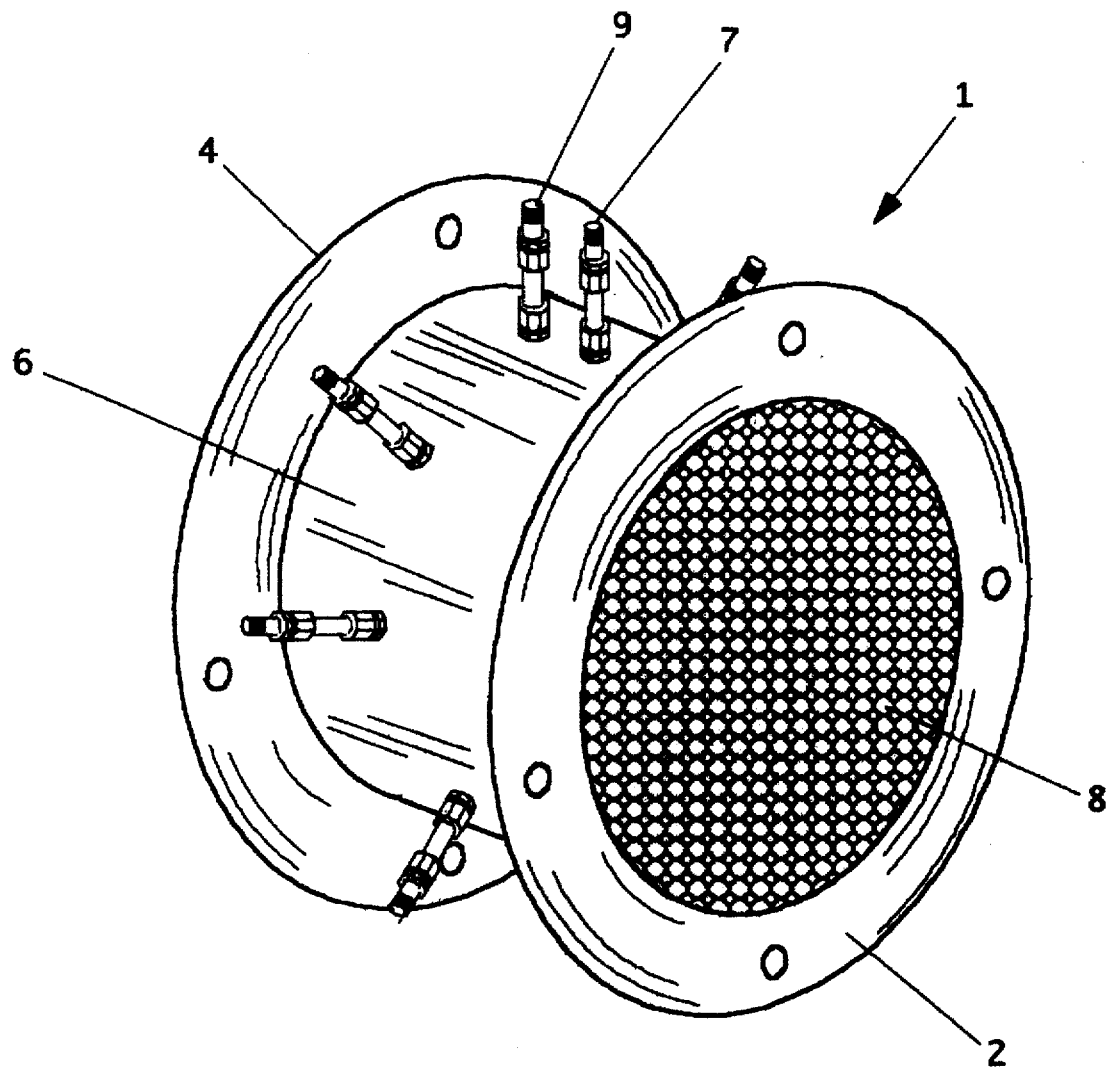
FIG. 1 is a front orthographic view of a flow element according to the present invention for use with a round fluid conduit.

As shown in FIG. 1, a fluid flow element, generally noted as 1, according to one embodiment of the present invention is disclosed having an inlet 2 in fluid communication with an outlet 4 mounted within a generally rigid housing 6. In its preferred embodiment, the housing 6 is made with the same internal dimensions as the fluid conduit in which it is to be utilized, and as shown in this embodiment a round housing 6 is provided. A first instrument tap 7 and a second instrument tap 9 are provided protruding outward from the housing 6, and will be described in greater detail below. An interior flow conditioner 8 is affixed at the inlet 2 of the flow element 1 in order to reduce swirls and distortions in fluid flow patterns as an air or gas enters the flow element inlet 2. Such "flow straightening" is known to improve a fluid flow profile within the housing 6, thereby increasing reliable accuracy when the flow element 1 is utilized in conduits which are unable to accommodate long straight flow runs upstream from the inlet 2.

Figure 2:
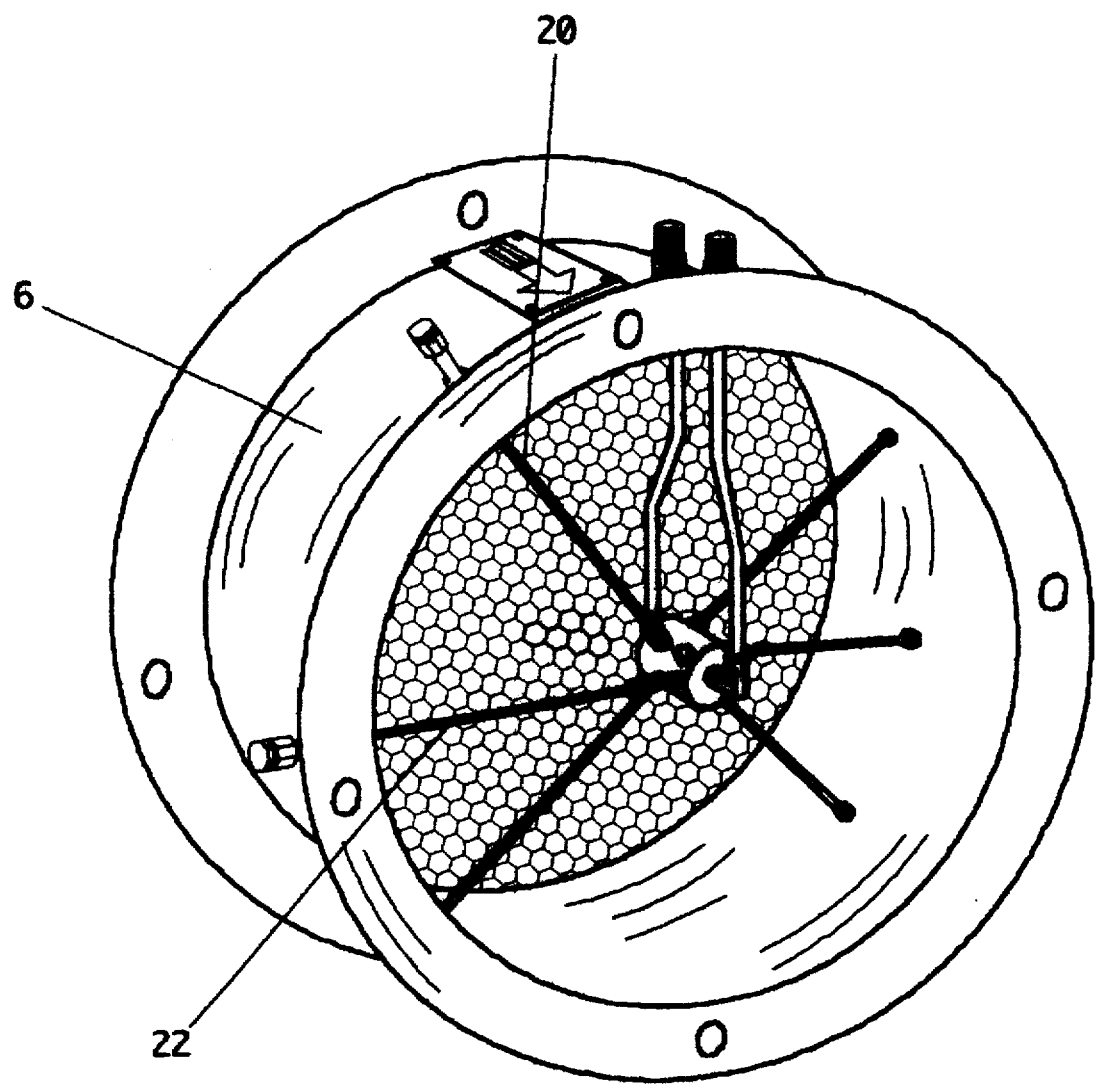
FIG. 2 is a rear orthographic view thereof.

As shown more clearly in the rear view in FIG. 2 and also in FIG. 3, a total pressure sensing pitot tube array (total array) 20 is affixed traversing the interior cross sectional area of flow element 1 for sensing the total pressure of fluid flowing into the flow element 1. Also, a static pressure sensing pitot tube array (static array) 22 is also affixed traversing the interior cross sectional area of the flow element 1 for sensing the average static pressure within the flow element. These pitot tube arrays 20, 22 will be more clearly described below. By locating the total array 20 within the housing 6 upstream relative to the static array 22, pitot tube flow principles are thereby utilized by sensing the total pressure of the flowing gas or air with the total pressure sensing pitot tube array, and the static pressure within the conduit is sensed by the static pressure sensing pitot tube array.

Figure 4:
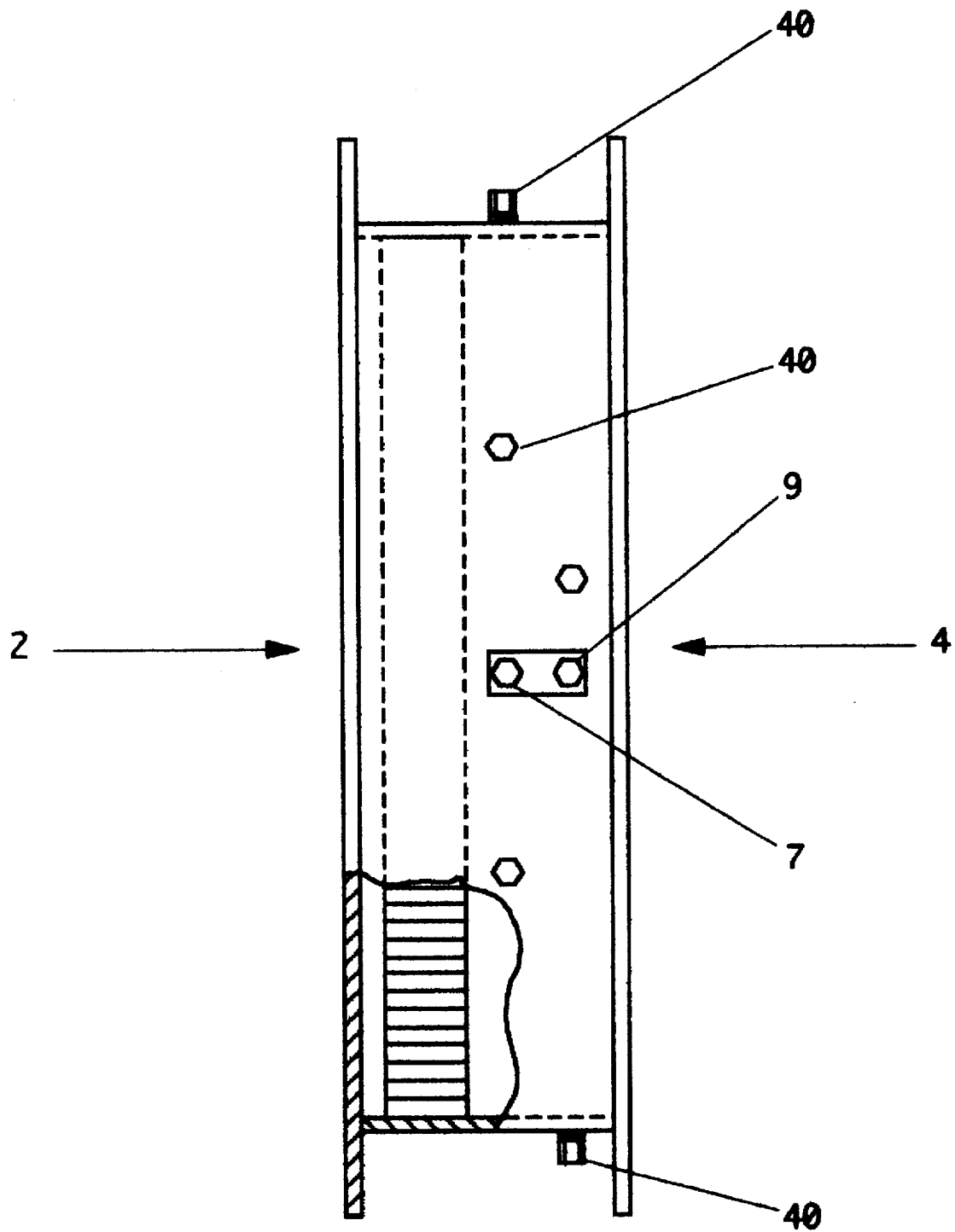
FIG. 4 is a side elevational view thereof.

As shown in FIG. 4, the first and second instrument taps 7, 9 are provide for connection of each array respectively to a differential pressure instrument for indicating flow rate and/or transmitting a flow rate signal. Further, exterior array access ports 40 are provided, as will be described in greater detail below, to permit cleaning of each pitot arrays should they become plugged with particulates.

Figure 5A:
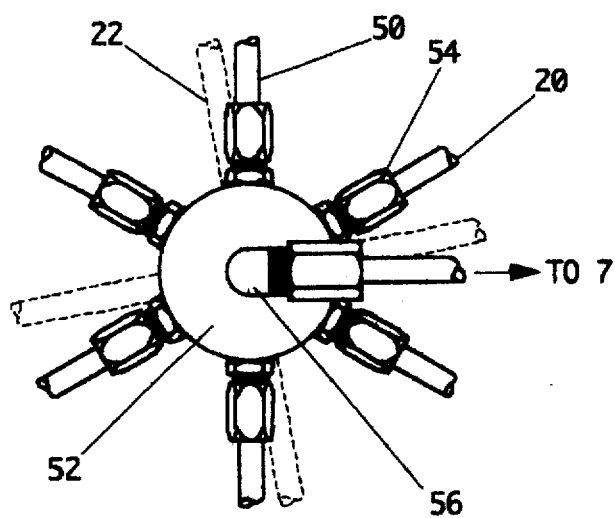
FIG. 5A is detailed view of a total pressure manifold as utilized with the flow element as shown in FIG. 3.

As shown in FIG. 5A, the total pressure sensing pitot tube array 20 is comprised of a plurality of linearly elongated pitot tubes 50 in fluid communication with and anchored to a total pressure manifold 52. Each pitot tube 50 is affixed to the total pressure manifold 52 in a conventional manner, herein depicted as a readily available compression tube fitting 54, such as Parker-Hannifin "Ferulok" fluid connectors or the like. Each pitot tube 50 has a plurality of sensing ports (not shown) directed to face directly toward the inlet 2, thereby providing free fluid communication between the impacting fluid flowing into the flow element 1, through the pitot tube 50, and to the total pressure manifold 52. The total pressure manifold 52 thereby consolidates this combined total pressure into a gathering port 56 and communicates this pressure along a first sensing conduit 58 to the first instrument tap 7. By way of contrast, classic pitot tubes are made as a concentric double tube with the inside tube having a port facing into the flowing stream for sensing total pressure and the outside tube having radially aligned holes for sensing static pressure.

Figure 5B:
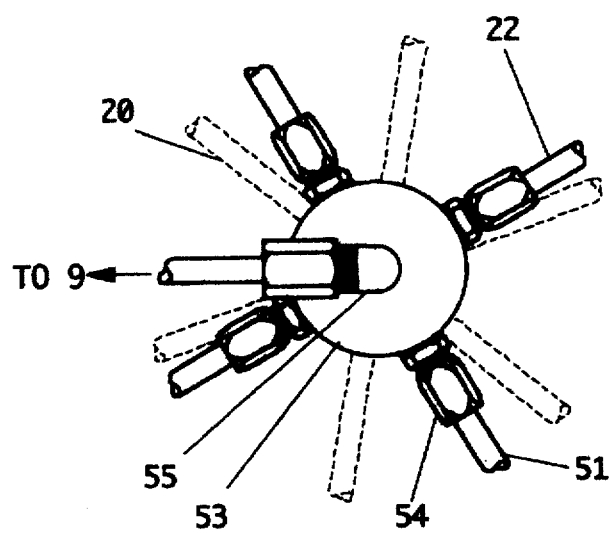
FIG. 5B is detailed view of a static pressure manifold as utilized with the flow element as shown in FIG. 3.

As shown in FIG. 5B, a similar arrangement is utilized for the static pressure sensing pitot tube array 22, which is comprised of a plurality of linearly elongated pressure sensing tubes 51 in fluid communication with and anchored to a static pressure manifold 53. Each pressure sensing tube 51 is affixed to the static pressure manifold 53 also in a similar, conventional manner, and again is herein depicted as a readily available compression tube fitting 54, such as Parker-Hannifin "Ferulok" fluid connectors or the like. Each pressure sensing tube 51 has a plurality of sensing ports (not shown) directed to face upstream toward the inlet. The sensing ports for the total pressure are located on the leading edge of the total pressure traverse tubes, while "static" pressure ports penetrate the side of the static pressure sensing pitot. The outlet manifold 53 consolidates this combined static pressure into a second gathering port 55 and communicates this pressure along a second sensing conduit 59 to the second instrument tap 9.

As shown best in FIG. 3 in conjunction with FIG. 5A, the traversing patterns formed by the pitot tubes 50 are not formed randomly by the arrays 20, 22, but rather are meticulously placed. The total number and location of sensing ports (not shown) are positioned in accordance with formulas recommended by engineering standards organizations. Specifically, it has been found that by positioning the sensing ports according to the log-Tchebycheff rule, rather than the older equal area method, greater accuracy can be achieved. The log-Tchebycheff determined locations of the sensing ports take into account low velocity patterns at the duct or conduit walls, thereby minimizing the high-flow inaccuracies generated by pitot array flow elements with sensing ports located using the older, less accurate equal area method. The number of total pressure sensing ports range from between 18 to 42 points, depending on the duct shape and area. More points are used in ducts exceeding 50 square feet.

Figure 6A:
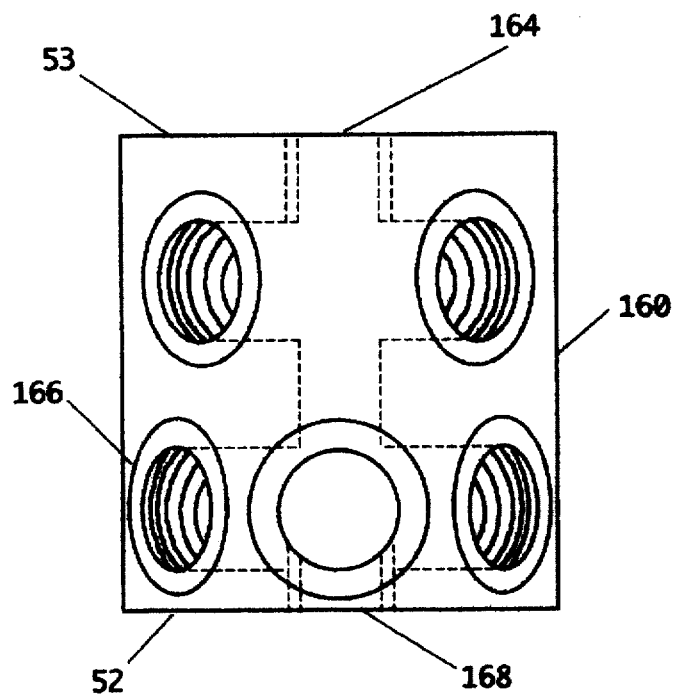
FIG. 6A is a side plan view of a combined manifold element as utilized in FIG. 5A and 5B.
Figure 6B:
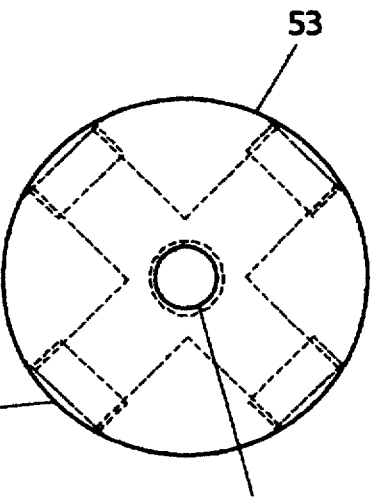
FIG. 6B is an end plan view of the combined manifold element shown in FIG. 6A.

In instances where the flow element is to be utilized for relatively small cross sectional area measurements, the number of pitot tubes 50 or pressure sensing tubes 51 are less than four. In such cases, it is envisioned that the total pressure sensing manifold 52 and/or static pressure sensing manifold 53 could be formed of standard tube fittings, such as "tees" and "crosses". Use of such standard components allows for easy assembly, as well as the ability to remove, repair, or replace individual pitot tubes in situ, without necessitating the removal of the entire fluid flow element 1. However, at relatively larger cross sectional area measurements, a need is developed to allow the formation of a predetermined pitot tube array while still allowing the use of standardized components, such as compression tube fittings 54. In its preferred embodiment, as shown in FIG. 6A, a combined manifold element 160 has been developed to physically combine in an attached manner the total pressure manifold 52 with the static pressure manifold 53. The combined manifold element 160 is formed of a single piece of solid metal bar stock, herein shown as round. One half is dedicated to formation of the total pressure manifold 52, and the opposite half is dedicated to the formation of the static pressure manifold 53. As shown in conjunction with FIG. 6B, the static pressure manifold 53 is formed by drilling an axial series of first manifold input holes 162 penetrating into the center of the combined element 160 and in fluid communication with each other. These holes 162 can then be tapped such as to receive standard compression tube fittings. A first common receiving hole 164 is then drilled and tapped in a similar manner along the perpendicular face of the element 160, in fluid communication with the holes 162. By threading this hole 164, the gathering port 55 is formed, also for use with conventional tube fittings.

Figure 6C:
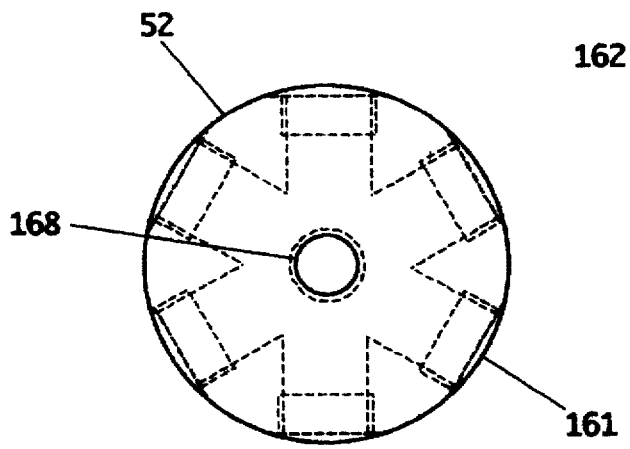
FIG. 6C is an end plan view showing the opposite end of the combined manifold element shown in FIG. 6B.

Similarly, as shown in FIG. 6A in conjunction with FIG. 6C, the total pressure manifold 52 is formed on the half of the combined manifold element 160 opposite to the static pressure manifold 53. A series of second manifold input holes 166 are similarly formed, and the second gathering port 56 is similarly formed by a second common receiving hole 168. Such an arrangement offers all the benefits of utilizing standard tube fittings for larger area housings 6, while at the same time minimizing total cross sectional obstruction area as well as labor intensive manufacturing processes such as the angular cutting and welding of tubing.

Figure 7:
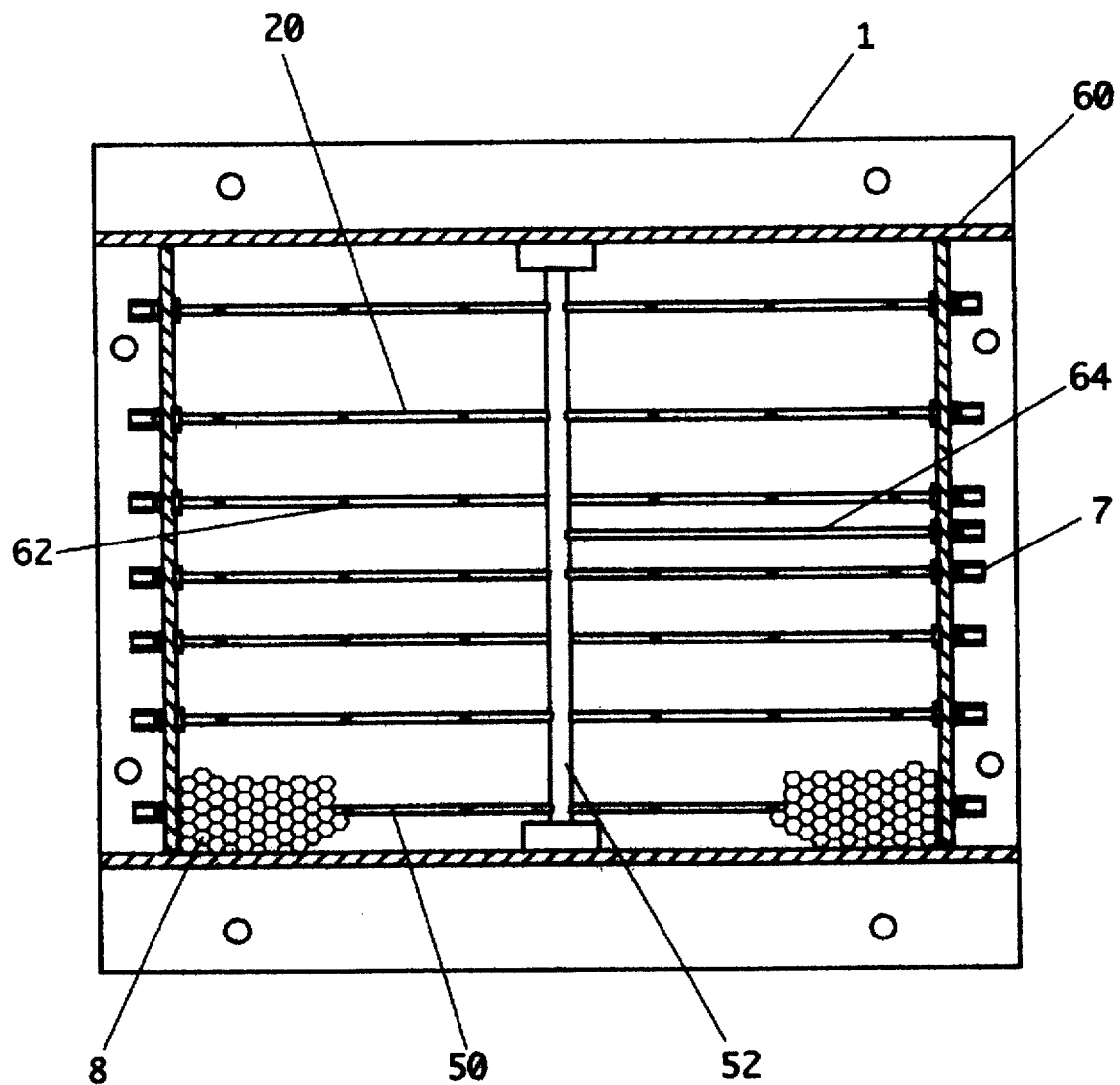
FIG. 7 is a front elevational view of a flow element according to the present invention for use with a rectangular fluid conduit.
Figure 8:
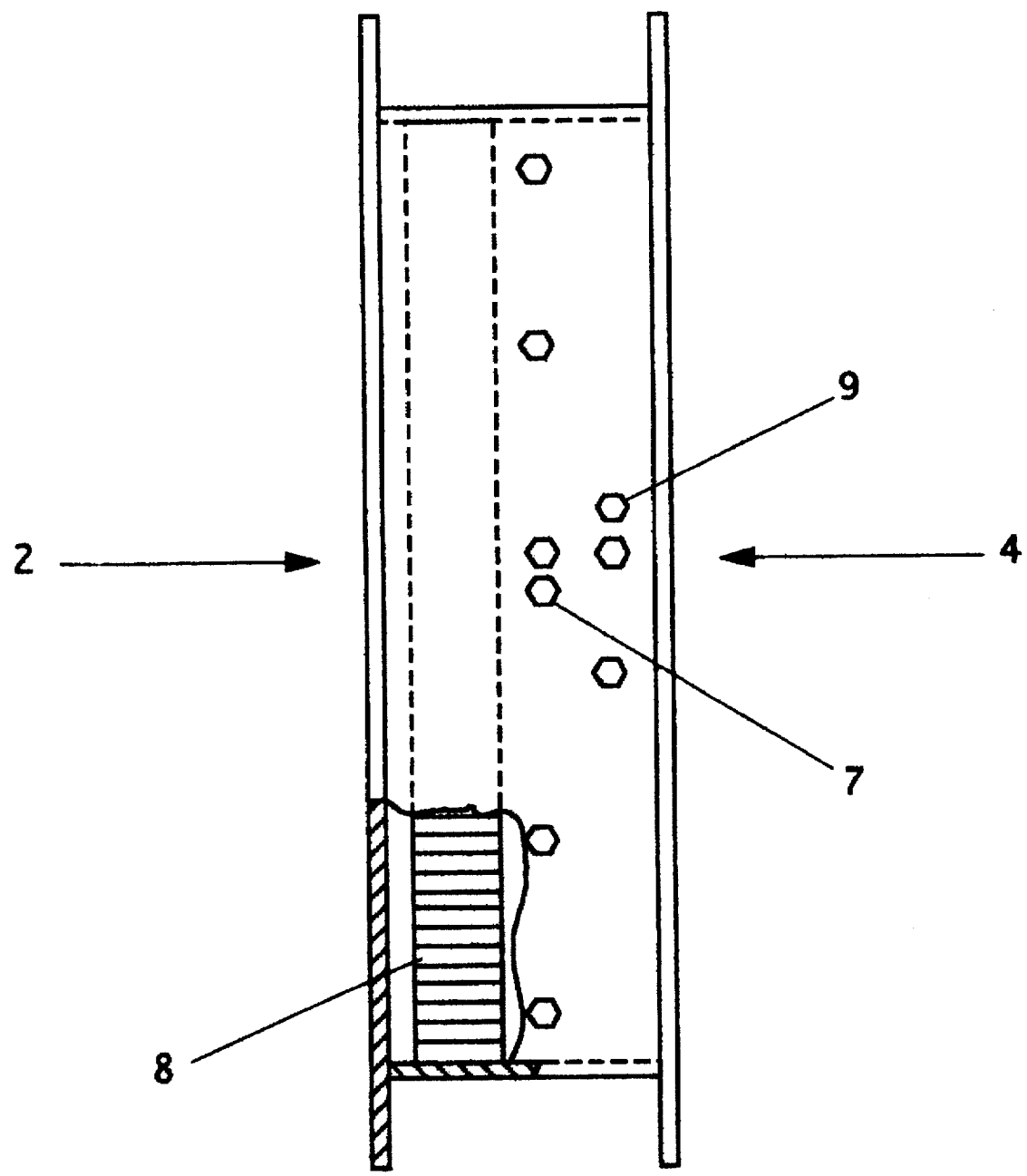
FIG. 8 is a side elevational view of the flow element shown in FIG. 6.

As shown in FIG. 7 and FIG. 8, an alternate embodiment for the fluid flow element 1 is shown having a generally rigid housing 60, also made with the same internal dimensions as the fluid conduit in which it is to be utilized, and as shown in this embodiment a rectangular housing is provided. The first instrument tap 7 and a second instrument tap 9 are similarly provided protruding outward from the rectangular housing 60, and once again the interior flow conditioner 8 is affixed at the inlet 2 of the flow element 1 in order to reduce swirls and distortions in fluid flow patterns as an air or gas enters the flow element inlet 2, thereby increasing reliable accuracy when the flow element 1 is utilized in conduits which are unable to accommodate long straight flow runs upstream from the inlet 2. The total pressure array 20 is once again comprised of a plurality of linearly elongated pitot tubes 50 in fluid communication with and anchored to an alternate total pressure manifold in a conventional manner, thereby providing free fluid communication between the impacting fluid flowing into the flow element 1, through the pitot tube 50, and to the total pressure manifold 52. The total pressure manifold 52 thereby consolidates this combined total pressure into and along a third sensing conduit 64 to the first instrument tap 7. A similar arrangement is utilized for the static pressure sensing pitot tube array.

Figure 9A:
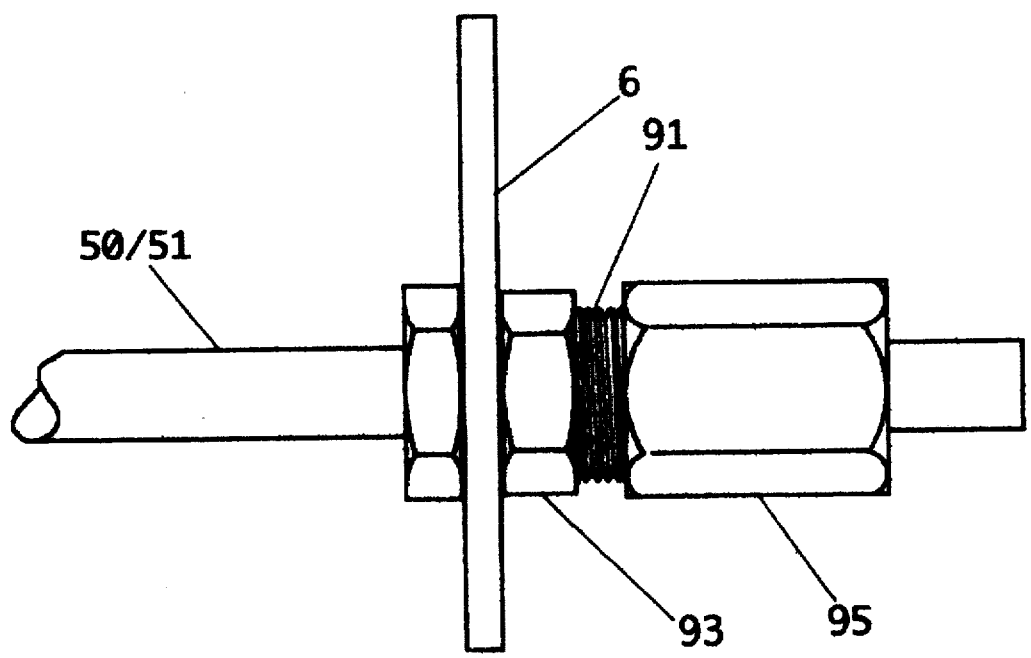
FIG. 9A is a detailed view of one embodiment of a tube shell penetration.
Figure 9B:
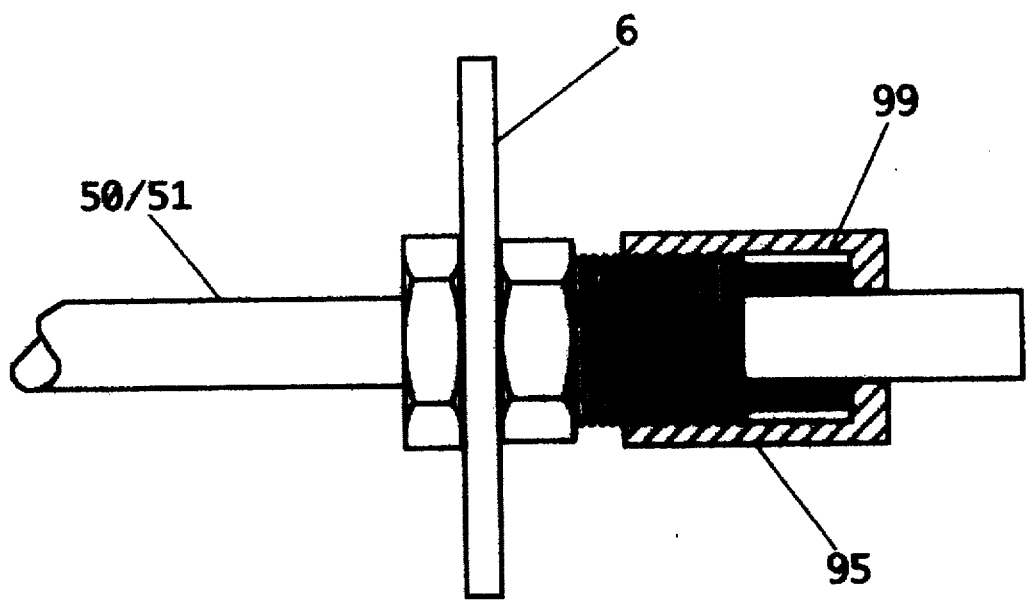
FIG. 9B is a detailed view of an alternate embodiment of a tube shell penetration.

In FIG. 9A, a typical housing penetration for an array tube is shown. In a generally conventional manner, the total pressure sensing tube 50 and static pressure sensing tube 51 are affixed to the housing 6 in a similar manner utilizing a ferrule 91 encircling the tube 50, 51 and compressed against a fitting 93 by a nut 95. Similarly, the opposite end of the sensing tube 50, 51 can be affixed at the manifold 52, 53 utilizing compression tube fittings. Such manner of generally affixing tubes penetrating a shell or connecting to other fittings is rather well known throughout the chemical process industries. However, in the currently envisioned application, such a method can result in additional problems, especially at high temperatures. With total pressure tubes 50 and static pressure sensing tubes 51 affixed at both ends, one end at the housing as shown in FIG. 9A and the other end at the total pressure manifold 52 or static pressure manifold 53 respectively as shown in FIGS. 5A and 5B, respectively, the tubes comprising each array are, in essence, "locked" in place. If various materials, such as differing grades of steel or stainless steel are utilized, differing expansion rates result upon heating or cooling. Such a condition can result in material stress and fatigue related leakage or failure, especially catastrophic seal failure, upon such high gradient temperature cycling. Also, the use of conventional ferrules 91 "lock" onto the tubing, thereby preventing the movement necessarily resulting from thermal differential expansion. Therefor, a particular improvement is embodied as shown in FIG. 9B, wherein a high-temperature tubing connection for a shell penetration, generally noted as 95, is shown. As is shown, a high temperature packing 97 replaces the ferrule 91. It is envisioned that a ribbon packing or packing ring made of any pliable material resistant to high temperatures can be utilized for this packing 97. However, in its preferred embodiment, a GRAPHOIL™ packing material, as manufactured by U-CAR™, or similar and equivalent material has been found to be successful in permanently "sealing" the tube 50 or 51 between the nut 95 and the fitting 93, thereby assuring a high pressure seal such that the housing 6 retains its integrity and remains leak-free even under conditions of extreme temperature or extreme temperature gradient cycling. Such a high temperature packing remains pliable to seal around the tubes 50 or 51, while still permitting lateral motion of the traverse tubes which is encountered when thermal differential expansion occurs. It is envisioned that such an improvement need be utilized at least one end of the sensing tube in order to prevent the stress damaged mentioned above.

Figure 10A:
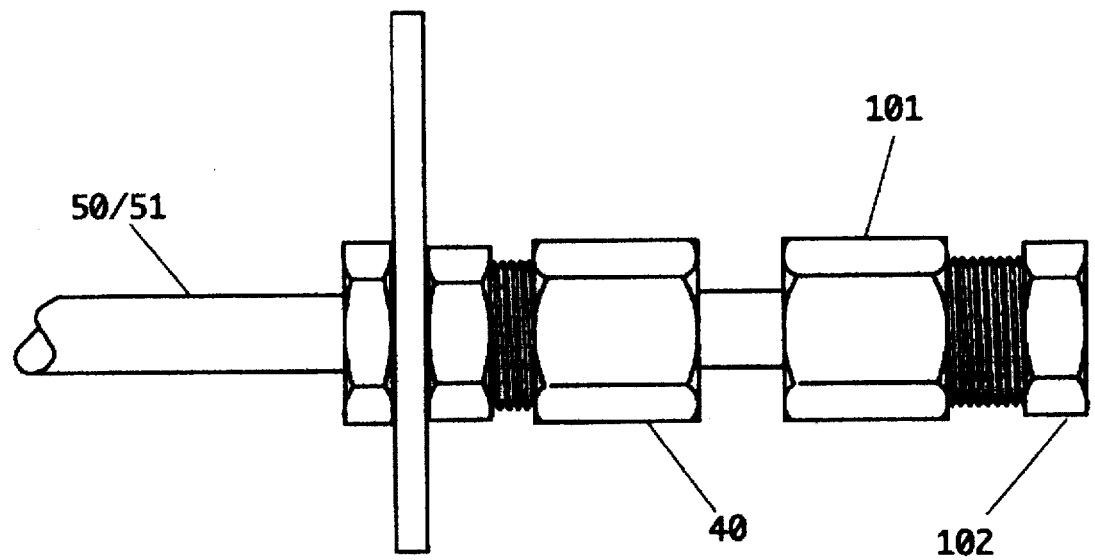
FIG. 10A is a detailed view of a traverse tube termination; and finally

Also, in FIG. 10A, an exterior array access port 40 is shown in greater detail, having an annular cap fitting 101 terminating the end of the tube, 50 or 51, and housing a plug fitting 102 for plugging the port thereby created. Such access ports 40 are useful for inspection or cleaning of the array tube interiors should debris accumulate in heavy particulate-laden applications. The cap fitting 101 with plug fitting 102 extend outward from the housing 6 by a sufficient length should any brushing or purging of the tubes be required. Further, an additional embodiment of the array access port as depicted in FIG. 10A could be adaptable for use with either tube shell penetration as shown in FIG. 9A and FIG. 9B.

Figure 10B:
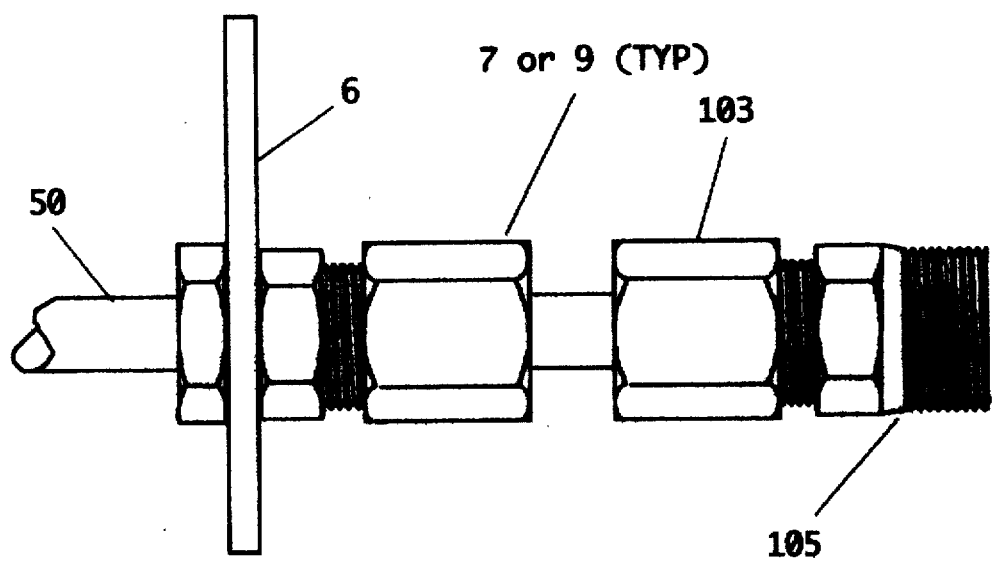
FIG. 10B is a detailed view of a signal tube termination.

Finally, in FIG. 10B a typical signal tube termination as embodied by the first instrument tap 7 and second instrument tap 9 is shown. A cap compression fitting 103 for mounting and containing a coupling 105 allows connection of the respective instrument tap to a differential pressure instrument for indicating flow rate and/or transmitting a flow rate signal. It is envisioned that the signal tube termination as depicted in FIG. 10B could be adaptable for use with either tube shell penetration as shown in FIG. 9A and FIG. 9B.

LIST OF REFERENCE NUMBERS

| | |
|---|---|
| 1 | fluid flow element |
| 2 | inlet |
| 4 | outlet |
| 6 | housing |
| 7 | first instrument tap |
| 8 | interior flow conditioner |
| 9 | second instrument tap |
| 20 | total pressure sensing pilot tube array (total pressure array) |
| 22 | static pressure sensing pilot tube array (static array) |
| 40 | exterior array access port |
| 50 | pilot tubes |
| 51 | pressure sensing tube |
| 52 | total pressure manifold |
| 53 | static pressure manifold |
| 54 | compression tube fitting |
| 55 | second gathering port |
| 56 | gathering port |
| 58 | first sensing conduit |
| 59 | second sensing conduit |
| 60 | rectangular housing |
| 62 | sensing port |
| 64 | total pressure sensing conduit |
| 91 | ferrule |
| 93 | fitting |
| 95 | nut |
| 96 | shell penetration |
| 97 | high temperature packing |
| 101 | annular cap fitting |
| 102 | plug fitting |
| 103 | cap compression fitting |
| 105 | coupling |
| 160 | combined manifold element |
| 162 | first manifold input hole |
| 164 | first common receiving hole |
| 166 | second manifold input hole |
| 168 | second common receiving hole |

While the preferred embodiments of the invention have been shown, illustrated, and described, it will be apparent to those skilled in this field that various modifications may be made in these embodiments without departing from the spirit of the present invention. For that reason, the scope of the invention is set forth in the following claims.

What is claimed is:

1. A high temperature gas flow sensing element for use within a fluid conduit, said flow sensing element comprising:

an annular housing with the same internal dimensions as the fluid conduit having an inlet, an outlet, and forming a hollow interior cross sectional area;

a total pressure sensing pitot tube array affixed within said housing traversing the interior cross sectional area of flow element for sensing the impact pressure of fluid flowing into the flow element;

a static pressure sensing pitot tube array affixed within said housing and traversing the interior cross sectional area of the flow element for sensing the average static pressure within the flow element; and exterior instrument taps for connection of each array respectively to a differential pressure instrument for indicating flow rate and/or transmitting a flow rate signal;

wherein said total pressure sensing pitot tube array further comprises
a total pressure manifold;
a plurality of linearly elongated pitot tubes each said pitot tube having two ends, a first end in fluid communication with said housing and second end in fluid communication with said total pressure manifold;
a plurality of sensing ports penetrating each said pitot tube and directed to face directly toward said inlet, thereby providing free fluid communication between the impacting fluid flowing into said flow element through said pitot tube, and to said total pressure manifold; and
a high-temperature tubing connection for affixing one of said two ends of each pitot tube, said high temperature tubing connection comprising a compression fitting seated around a ribbon packing or packing ring made of any pliable material resistant to high temperatures.

2. The high temperature gas flow sensing element as described in claim 1, further comprising an exterior array access port penetrating said housing and in communication with each said pitot array for cleaning of said pitot arrays should they become plugged with particulates.

3. The high temperature gas flow sensing element as described in claim 1, wherein said ribbon packing or packing ring is comprised of GRAPHOIL™ packing material, as manufactured by U-CAR™, or similar and equivalent material.

4. The high temperature gas flow sensing element as described in claim 2, wherein said exterior array access port for inspection or cleaning of the array tube interiors comprise an annular cap fitting terminating the end of each said array tube, said cap fitting housing a plug fitting for removably plugging the port thereby created.

5. The high temperature gas flow sensing element as described in claim 1, wherein said a static pressure sensing pitot tube array comprises:
a static pressure manifold;
a plurality of linearly elongated pressure sensing tubes having a first end and a second end in fluid communication with and anchored at said second end to said static pressure manifold;
a plurality of sensing ports penetrating each said pressure sensing tube and directed to face directly toward said inlet, thereby providing free fluid communication between the impacting fluid flowing into said flow element through the pitot tube, and to the total pressure manifold; and
a high-temperature tubing connection for affixing said first end of each said pitot tube to said housing, said high temperature tubing connection comprising a compression fitting seated around a ribbon packing or packing ring made of any pliable material resistant to high temperatures.

6. The high temperature gas flow sensing element as described in claim 1, wherein said ribbon packing or packing ring is comprised of GRAPHOIL™ packing material, as manufactured by U-CAR™, or similar and equivalent material, said packing remains pliable to seal around said pitot tubes while still permitting lateral motion of said pitot tubes which is encountered when thermal differential expansion occurs.

7. The high temperature gas flow sensing element as described in claim 1, wherein said total pressure sensing pitot tube array comprises a plurality of individual pitot tubes arranged such across said interior cross sectional area such that traversing patterns formed by the pitot tubes are placed such that the total number and location of sensing ports are positioned according to the log-Tchebycheff rule.

8. The high temperature gas flow sensing element as described in claim 1, wherein said total pressure manifold comprises a single piece of solid, cylindrical, metal bar stock penetrated by an axial series of first manifold input holes penetrating into the center of the bar stock and in fluid communication with each other, each said hole then being tapped such as to receive a standard compression tube fittings, and further comprising a first common receiving hole drilled and tapped in a similar manner along the perpendicular face of the bar stock and, in fluid communication with said holes.

9. The high temperature gas flow sensing element as described in claim 8, wherein both said manifolds are formed at opposite ends of the same piece of metal bar stock.

10. The high temperature gas flow sensing element as described in claim 1, wherein said high-temperature tubing connection is affixed to said first end of each said pitot tube.

11. The high temperature gas flow sensing element as described in claim 1, wherein said high-temperature tubing connection is affixed to said second end of each said pitot tube.

12. A high temperature gas flow sensing element for use within a fluid conduit, said flow sensing element comprising:
an annular housing with the same internal dimensions as the fluid conduit having an inlet, an outlet, and forming a hollow interior cross sectional area;
a total pressure sensing pitot tube array affixed within said housing traversing the interior cross sectional area of flow element for sensing the impact pressure of fluid flowing into the flow element;
a static pressure sensing pitot tube array affixed within said housing and traversing the interior cross sectional area of the flow element for sensing the average static pressure within the flow element; and
exterior instrument taps for connection of each array respectively to a differential pressure instrument for indicating flow rate and/or transmitting a flow rate signal;
said static pressure sensing pitot tube array further comprises
a static pressure manifold;
a plurality of linearly elongated pressure sensing tubes, each said pressure sensing tube having two ends, a first end in fluid communication with said housing and second end in fluid communication with said static pressure manifold;
a plurality of sensing ports penetrating each said pressure sensing tube and directed to face directly toward said inlet, thereby providing free fluid communication between the impacting fluid flowing into said flow element through said pressure sensing tube, and to said static pressure manifold; and a high-temperature tubing connection for affixing at least one of said two ends of each pressure sensing tube.

13. The high temperature gas flow sensing element as described in claim 12, wherein said static pressure manifold comprises a single piece of solid, cylindrical, metal bar stock penetrated by an axial series of second manifold input holes penetrating into the center of the bar stock and in fluid communication with each other, each said hole then being tapped such as to receive a standard compression tube fittings, and further comprising a second common receiving hole drilled and tapped in a similar manner along the perpendicular face of the bar stock and, in fluid communication with said holes.

14. The high temperature gas flow sensing element as described in claim 13, wherein both said manifolds are formed at opposite ends of the same piece of metal bar stock.

15. The high temperature gas flow sensing element for use within a fluid conduit of claim 12, wherein said high temperature tubing connection comprising a compression fitting seated around a ribbon packing or packing ring made of any pliable material resistant to high temperatures.

16. The high temperature gas flow sensing element as described in claim 15, wherein said ribbon packing or packing ring is comprised of GRAPHOIL™ packing material, as manufactured by U-CAR™, or similar and equivalent material.

17. The high temperature gas flow sensing element as described in claim 15, wherein said ribbon packing or packing ring is comprised of GRAPHOIL™ packing material, as manufactured by U-CAR™, or similar and equivalent material, said packing remains pliable to seal around said pitot tubes while still permitting lateral motion of said pitot tubes which is encountered when thermal differential expansion occurs.

18. A high temperature gas flow sensing element for use within a fluid conduit, said flow sensing element comprising:

an annular housing with the same internal dimensions as the fluid conduit having an inlet, an outlet, and forming a hollow interior cross sectional area;

a total pressure sensing pitot tube array affixed within said housing traversing the interior cross sectional area of flow element for sensing the impact pressure of fluid flowing into the flow element;

a static pressure sensing pitot tube array affixed within said housing and traversing the interior cross sectional area of the flow element for sensing the average static pressure within the flow element;

exterior instrument taps for connection of each array respectively to a differential pressure instrument for indicating flow rate and/or transmitting a flow rate signal; and a high-temperature tubing connection for affixing at least one of said two ends of each pressure sensing tube, said connection capable of sealing around said pitot tubes while still permitting lateral motion of said pitot tubes which is encountered when thermal differential expansion occurs.

19. The high temperature gas flow sensing element for use within a fluid conduit of claim 18, wherein said high temperature tubing connection comprising a compression fitting seated around a ribbon packing or packing ring made of any pliable material resistant to high temperatures.

20. The high temperature gas flow sensing element as described in claim 19, wherein said ribbon packing or packing ring is comprised of GRAPHOIL™ packing material, as manufactured by U-CAR™, or similar and equivalent material.

* * * * *